US012518099B2

(12) United States Patent
Pawlowski et al.

(10) Patent No.: US 12,518,099 B2
(45) Date of Patent: Jan. 6, 2026

(54) SYSTEM TO IDENTIFY SIZE AND LOCATION INFORMATION FROM UNSTRUCTURED INPUTS

(71) Applicant: nference, inc., Cambridge, MA (US)

(72) Inventors: Colin Pawlowski, Brighton, MA (US); Viral Pandey, Cambridge, MA (US); Mayank Choudhary, Boston, MA (US); Aiveliagaram J. Venkatakrishnan, Cambridge, MA (US); Murali Aravamudan, Andover, MA (US); Venkataramanan Soundararajan, Andover, MA (US)

(73) Assignee: nference, Inc., Cambridge, MA (US)

( * ) Notice: Subject to any disclaimer, the term of this patent is extended or adjusted under 35 U.S.C. 154(b) by 233 days.

(21) Appl. No.: 18/166,676

(22) Filed: Feb. 9, 2023

(65) Prior Publication Data
US 2023/0252238 A1    Aug. 10, 2023

Related U.S. Application Data

(60) Provisional application No. 63/308,191, filed on Feb. 9, 2022.

(51) Int. Cl.
| | |
|---|---|
| *G06F 40/295* | (2020.01) |
| *G06F 40/205* | (2020.01) |
| *G16H 10/60* | (2018.01) |
| *G16H 15/00* | (2018.01) |
| *G16H 50/20* | (2018.01) |
| *G16H 50/30* | (2018.01) |

(52) U.S. Cl.
CPC .......... *G06F 40/295* (2020.01); *G06F 40/205* (2020.01); *G16H 10/60* (2018.01); *G16H 15/00* (2018.01); *G16H 50/20* (2018.01); *G16H 50/30* (2018.01)

(58) Field of Classification Search
CPC ..... G06F 40/295; G06F 40/205; G16H 10/60; G16H 15/00; G16H 50/30; G16H 50/20
See application file for complete search history.

(56) References Cited

U.S. PATENT DOCUMENTS

| | | | |
|---|---|---|---|
| 10,235,360 B2* | 3/2019 | Sevenster | G06F 40/40 |
| 10,957,433 B2* | 3/2021 | Lucas | G16H 70/00 |
| 12,170,133 B2* | 12/2024 | Sharma | G06V 30/416 |

OTHER PUBLICATIONS

Yim, Wen-wai, Tyler Denman, Sharon W. Kwan, and Meliha Yetisgen, "Tumor information extraction in radiology reports for hepatocellular carcinoma patients", Jul. 2016, AMIA Joint Summits on Translational Science 2016, pp. 455-464. (Year: 2016).*

(Continued)

*Primary Examiner* — Daniel C Washburn
*Assistant Examiner* — James Boggs
(74) *Attorney, Agent, or Firm* — Caldwell Intellectual Property Law

(57) ABSTRACT

A method including receiving an input of unstructured data; extracting at least one size entity and at least one location entity from the unstructured data using a named entity recognition model; parsing dimensions of the at least one size entity; and outputting structured size data and structured location data.

45 Claims, 7 Drawing Sheets

(56) References Cited

OTHER PUBLICATIONS

Xin, Kexuan, Wen Hua, Yu Liu, and Xiaofang Zhou, "Entity Disambiguation Based on Parse Tree Neighbours on Graph Attention Network", Nov. 2019, Lecture Notes in Computer Science (including subseries Lecture Notes in Artificial Intelligence and Lecture Notes in Bioinformatics), pp. 523-537. (Year: 2019).*

Coden, Anni, G. Savova, I. Sominsky, M. Tanenblatt, J. Masanz, K. Schuler, J. Cooper, W. Guan, and P. De Groen, "Automatically extracting cancer disease characteristics from pathology reports into a Disease Knowledge Representation Model", 2009, Journal of Biomedical Informatics, vol. 42, pp. 937-949. (Year: 2009).*

Yu, Xin, Wenshen Hu, Sha Lu, Xiaoyan Sun, and Zhenming Yuan, "BioBERT based named entity recognition in electronic medical record", Aug. 2019, 2019 10th International Conference on Information Technology in Medicine and Education (ITME), pp. 49-52. (Year: 2019).*

Wu, Pei-Hao, Avon Yu, Ching-Wei Tsai, Jia-Ling Koh, Chin-Chi Kuo, and Arbee L. P. Chen, "Keyword extraction and structuralization of medical reports", Apr. 2020, Health Information Science and Systems, vol. 8, pp. 1-25. (Year: 2020).*

Bozkurt, Selen, Emel Alkim, Imon Banerjee, and Daniel L. Rubin, "Automated Detection of Measurements and Their Descriptors in Radiology Reports Using a Hybrid Natural Language Processing Algorithm", Jun. 2019, Journal of Digital Imaging, vol. 32, pp. 544-553. (Year: 2019).*

Steinkamp, Jackson M., Charles Chambers, Darco Lalevic, Hanna M. Zafar, and Tessa S. Cook, "Toward Complete Structured Information Extraction from Radiology Reports Using Machine Learning", Jun. 2019, Journal of Digital Imaging, vol. 32, No. 4, pp. 554-564. (Year: 2019).*

Liang, Zihong, Junjie Chen, Zhaopeng Xu, Yuyang Chen, and Tianyong Hao, "A Pattern-Based Method for Medical Entity Recognition From Chinese Diagnostic Imaging Text", May 2019, Frontiers in Artificial Intelligence, vol. 2, pp. 1-8. (Year: 2019).*

Sevenster, M., J. Buurman, P. Liu, J. F. Peters, and p. J. Chang, "Natural Language Processing Techniques for Extracting and Categorizing Finding Measurements in Narrative Radiology Reports", Sep. 2015, Applied Clinical Informatics, vol. 6, No. 03, pp. 600-610. (Year: 2015).*

Ou, Ying, and Jon Patrick, "Automatic Population of Structured Reports from Narrative Pathology Reports", Jan. 2014, Proceedings of the Seventh Australasian Workshop on Health Informatics and Knowledge Management, vol. 153, pp. 41-50. (Year: 2014).*

* cited by examiner

EXAM: MR BRAIN WITH IV CONTRAST COMPARISON: MRI head dated 09/26/2019, 10/26/2018, 10/08/2016.

FINDINGS: Enhancing mass centered within the *left porous acusticus* with both intra- and extracanalicular components, measuring roughly <u>1.8 x 1.2 cm in the maximum axial plane and 1.4 cm craniocaudally</u>, indenting the lateral margin of the left middle cerebellar peduncle (no parenchymal signal abnormality). The lesion has subtly increased in size since 10/2019 where it measured 1.7 x 1.2 x 1.3 cm, and clearly increased in size when compared exams dating back to 10/2016 where it measured 1 x 0.6 x 0.3 cm. Normal appearance of the right cerebellopontine angle. Preservation of the normal high signal within the bilateral cochlea and semicircular canals. Increased T2 signal within the periventricular white matter and multiple scattered foci within the subcortical white matter, likely due to chronic small vessel ischemic disease.

IMPRESSION: Presumed left vestibular schwannoma centered within the *left porous acusticus*, measuring <u>1.8 x 1.2 x 1.4 cm</u>, indenting the lateral margin of the left middle cerebellar peduncle. The lesion has subtly increased in size since 10/2019, but clearly increased in size when compared to exams dating back to 10/2016 where it measured 1 x 0.6 x 0.3 cm.

FIG. 2

SYSTEM TO IDENTIFY SIZE AND LOCATION INFORMATION FROM UNSTRUCTURED INPUTS

RELATED APPLICATIONS

This application claims priority to U.S. Provisional Application No. 63/308,191, filed on Feb. 9, 2022, the contents of which is incorporated by reference herein in its entirety.

FIELD OF THE INVENTION

The present disclosure relates to systems, methods, and computer readable media for identification of size and location information from unstructured data.

BACKGROUND

Monitoring the size and the location of tumors is important in evaluating treatments and managing clinical care pathways and evaluating treatments. Tumor size and location information are typically captured in unstructured free text in radiology reports but rarely appear as structured data fields within relational electronic health record (EHR) databases. With natural language processing, a more accurate augmented curation of unstructured EHR data for clinical variables is possible. Natural Language Processing (NLP) systems can be used to process unstructured text data. However, accurate NLP models using deep neural networks have only been introduced and applied to limited clinical contexts recently.

Although NLP models have been developed to extract certain entities from medical documents with high accuracy, there are currently no end-to-end NLP systems which can process longitudinal tumor size and location information from data such as unstructured radiology reports. None of the existing NLP systems can distinguish between prior and current tumors in a radiology report with high accuracy, so they cannot be used to construct longitudinal patient journeys. In addition, none of the existing systems leverage pre-trained language models based on deep neural networks, which achieve state-of-the-art performance on Named Entity Recognition (NER) tasks in the biomedical domain. Furthermore, none of the existing systems have been incorporated as software into an existing EHR system or deployed at scale on a large EHR database. Using a combination of advanced NLP methods applied to medical documents, the methods described herein structure the unstructured text by deriving meaningful information like tumor size, location, and many other data points that, if done manually, would be quite time-consuming, expensive and non-scalable.

BRIEF SUMMARY OF THE EMBODIMENTS

In one aspect, a method includes receiving an input of unstructured data; extracting at least one size entity and at least one location entity from the unstructured data using a named entity recognition model; parsing dimensions of the at least one size entity; and outputting structured size data and structured location data.

In some embodiments, the method further includes linking at least one size entity and at least one location entity.

In some embodiments, at least one location entity is in a sentence with exactly one size entity and that location entity is linked with that size entity.

In some embodiments, at least one location entity is in a sentence with more than one size entity and that location entity is linked with a size entity with the closest distance metric.

In some embodiments, the distance metric is a number of words.

In some embodiments, the distance metric is a path in a dependency tree.

In some embodiments, at least one location entity is in a sentence without a size entity and is linked to a size entity in an adjacent sentence.

In some embodiments, the method further includes determining an anatomical location for the at least one size entity.

In some embodiments, determining the anatomical location includes using metadata of the input.

In some embodiments, the input is a health record of an individual and determining the anatomical location includes using a dictionary mapping types of health records to anatomical locations.

In some embodiments, determining the anatomical location includes using a location entity linked with the size entity.

In some embodiments, the method includes extracting more than one size entity and further including identifying any size entities that refer to a common lesion.

In some embodiments, identifying any size entities that refer to a common lesion includes comparing dimensions of two or more size entities.

In some embodiments, identifying any size entities that refer to a common lesion includes identifying a section of the input where the size entities are located.

In some embodiments, identifying any size entities that refer to a common lesion includes identifying an estimation keyword.

In some embodiments, the input includes a health record of an individual.

In some embodiments, the input includes a radiography report of an individual.

In some embodiments, the input includes a plurality of health records of an individual, each health record from a point in time.

In some embodiments, the named entity recognition model is a BERT-based named entity recognition model.

In some embodiments, the named entity recognition model is trained using an annotated unstructured dataset.

In some embodiments, the named entity recognition model is trained using a dataset of manually annotated health records.

In some embodiments, the method further includes training the named entity recognition model using an annotated unstructured dataset.

In some embodiments, the named entity recognition model extracts size entities and location entities from a current observation without extracting size entities and location entities from a prior observation.

In some embodiments, parsing dimensions includes using regular expressions.

In some embodiments, wherein parsing dimensions of each of the size entities includes extracting a vector of numeric values and a vector of units.

In some embodiments, parsing dimensions of each of the size entities includes calculating a maximum dimension of each parsed size entity.

In one aspect, a system includes a non-transitory memory; and one or more hardware processors configured to read instructions from the non-transitory memory that, when executed cause one or more of the hardware processors to perform operations including: receiving an input of unstructured data; extracting at least one size entity and at least one location entity from the unstructured data using a named entity recognition model; parsing dimensions of the at least one size entity; outputting structured size data and structured location data.

In some embodiments, the operations further include linking at least one size entity and at least one location entity.

In some embodiments, at least one location entity is in a sentence with exactly one size entity and that location entity is linked with that size entity.

In some embodiments, at least one location entity is in a sentence with more than one size entity and that location entity is linked with a size entity with the closest distance metric.

In some embodiments, at least one location entity is in a sentence without a size entity and is linked to a size entity in an adjacent sentence.

In some embodiments, the operations further include determining an anatomical location for the at least one size entity.

In some embodiments, determining the anatomical location includes using metadata of the input.

In some embodiments, determining the anatomical location includes using a location entity linked with the size entity.

In some embodiments, the operations further include extracting more than one size entity and further including identifying any size entities that refer to a common lesion.

In some embodiments, identifying any size entities that refer to a common lesion includes comparing dimensions of two or more size entities.

In some embodiments, the named entity recognition model is trained using an annotated unstructured dataset.

In some embodiments, the named entity recognition model extracts only size entities and location entities from a current observation without extracting size entities from a prior observation.

In some aspect a non-transitory computer-readable medium store instructions that, when executed by one or more hardware processors, cause the one or more hardware processors to perform operations including: receiving an input of unstructured data; extracting at least one size entity and at least one location entity from the unstructured data using a named entity recognition model; parsing dimensions of the at least one size entity; and outputting structured size data and structured location data.

In some embodiments, the operations further include linking at least one size entity and at least one location entity.

In some embodiments, at least one location entity is in a sentence with exactly one size entity and that location entity is linked with that size entity.

In some embodiments, at least one location entity is in a sentence with more than one size entity and that location entity is linked with a size entity with the closest distance metric.

In some embodiments, at least one location entity is in a sentence without a size entity and is linked to a size entity in an adjacent sentence.

In some embodiments, the operations further include determining an anatomical location for the at least one size entity.

In some embodiments, determining the anatomical location includes using metadata of the input.

In some embodiments, determining the anatomical location includes using a location entity linked with the size entity.

In some embodiments, the operations further include extracting more than one size entity and further including identifying any size entities that refer to a common lesion.

In some embodiments, identifying any size entities that refer to a common lesion includes comparing dimensions of two or more size entities.

In some embodiments, the named entity recognition model is trained using an annotated unstructured dataset.

In some embodiments, the named entity recognition model extracts only size entities and location entities from a current observation without extracting size entities from a prior observation.

Any one of the embodiments disclosed herein may be properly combined with any other embodiment disclosed herein. The combination of any one of the embodiments disclosed herein with any other embodiments disclosed herein is expressly contemplated.

BRIEF SUMMARY OF THE DRAWINGS

The objects and advantages will be apparent upon consideration of the following detailed description, taken in conjunction with the accompanying drawings, in which like reference characters refer to like parts throughout, and in which:

FIG. 2 shows a radiology report with tagged NER entities from an MRI scan, according to certain embodiments.

DETAILED DESCRIPTION

Disclosed herein are systems and methods for training and deploying a Natural Language Processing (NLP) algorithm that extracts structured size and location information from unstructured medical records (e.g., free-text radiology reports). In some embodiments, the input for this algorithm is an electronic medical record, for example, a set of timestamped radiology reports for an individual from the electronic health record. In some embodiments, an unstructured record includes descriptions of tumor size and locations. However, the methods disclosed herein can also be applied to other inputs of unstructured data. For example, other unstructured data inputs can include any adaptations or summaries of radiology reports, clinical notes, pathology reports, or hospital discharge summaries. In some embodiments, the output of this algorithm includes structured information about size and location, for example, size and location information for the solid tumors of this individual described in the radiology reports over time.

Figure 1A:
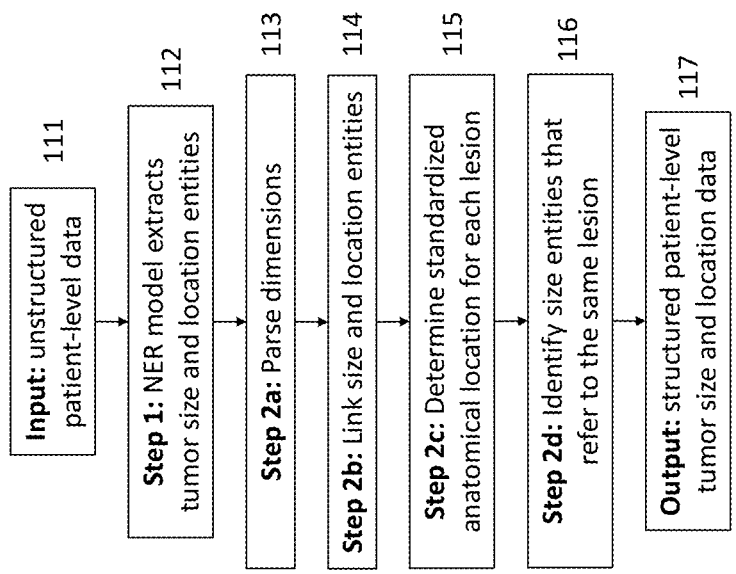
FIG. 1A shows a flow diagram of an NLP method, according to certain embodiments.

The algorithm or method can run on each input or record (e.g., radiology report) for the individual independently and concatenate the results with timestamp information as a final processing step. FIGS. 1A-1D show an illustrative visual representation of the NLP method. FIG. 1A shows a flow diagram of an illustrative NLP method. The input (111) for the method is unstructured patient-level data (e.g., an electronic health record or a radiology report). In this example, for each radiology report, in Step 1 (112) a Named Entity Recognition (NER) model extracts the sizes and locations of all lesions described in the radiology report (tumor size and location entities), excluding references to past lesion sizes or locations. In Step 2a (113), a rule-based method parses the extracted size entities to determine the dimensions (e.g., values and units) of the lesions described in the radiology report. In Step 2b (114), a rule-based method is used to identify pairs of tumor size and location entities which refer to the same lesion in the radiology report. In Step 2c (115), a hierarchical classifier is used to determine the anatomical location of each lesion described in the radiology report. In Step 2d (116), a rule-based method is used to identify the size entities that refer to the same lesion. The output (117) of the method is structured tumor size and location data. The structured output can be organized and formatted so that it is easily searchable in a database. In some embodiments, one of Step 2b, Step 2c, and Step 2d is omitted. For example, Step 2d can be omitted if there is only one size entity included in the input. In some embodiments, any combination of Step 2b, Step 2c, and Step 2d is omitted.

Figure 1C:
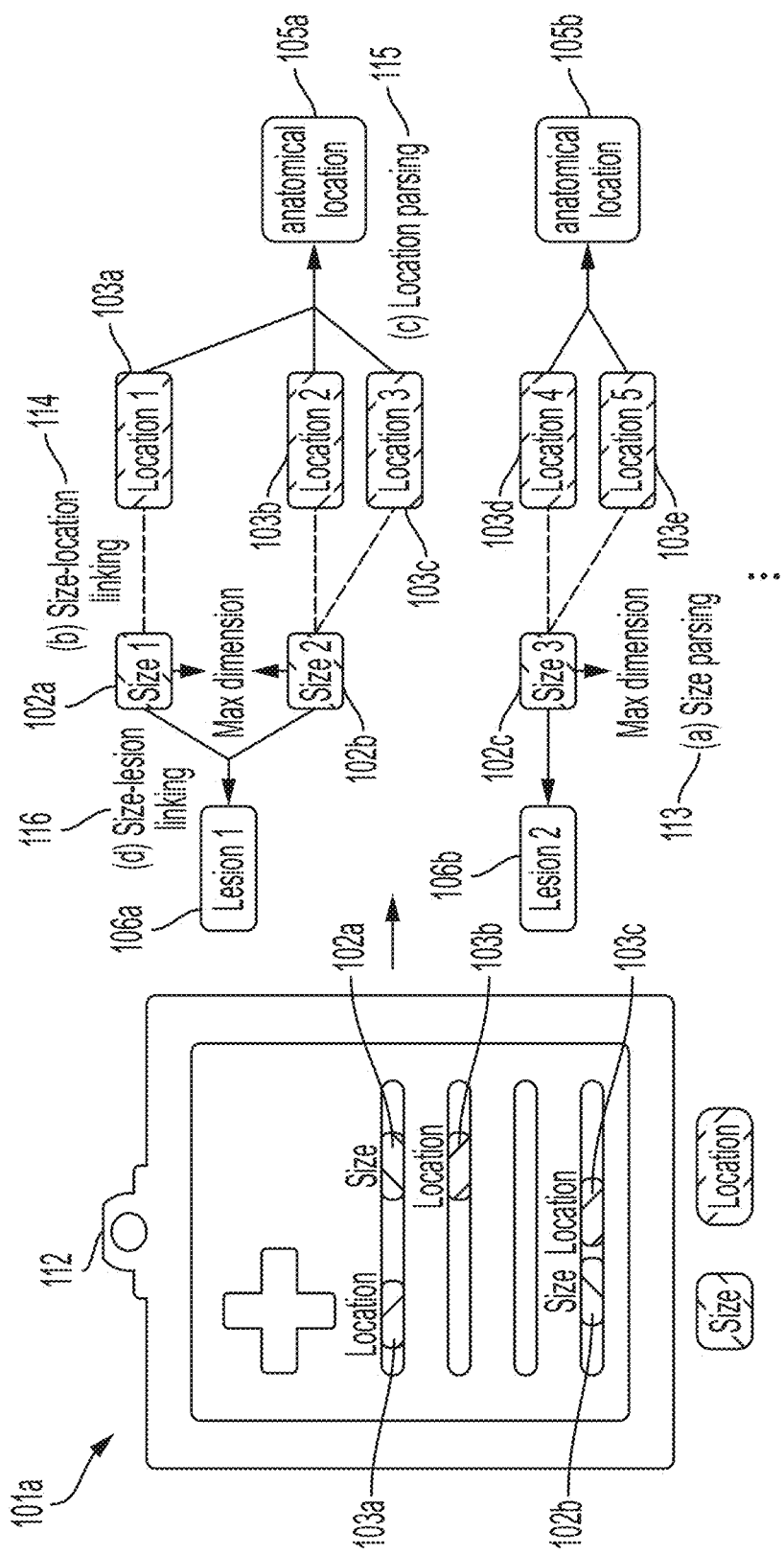
FIG. 1C shows the procedure of an NLP method, according to certain embodiments.
Figure 1B:
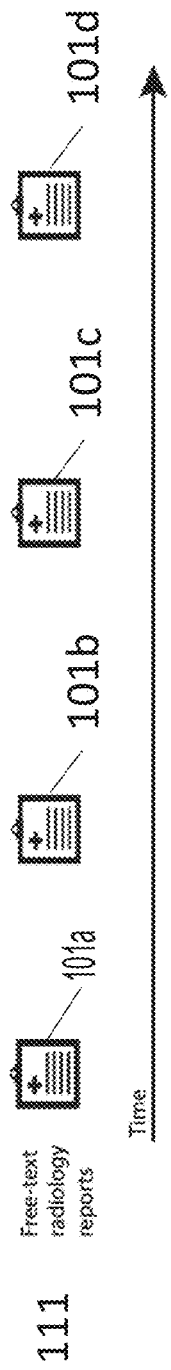
FIG. 1B shows input of unstructured patient-level data into an NLP method, according to certain embodiments.
Figure 1D:
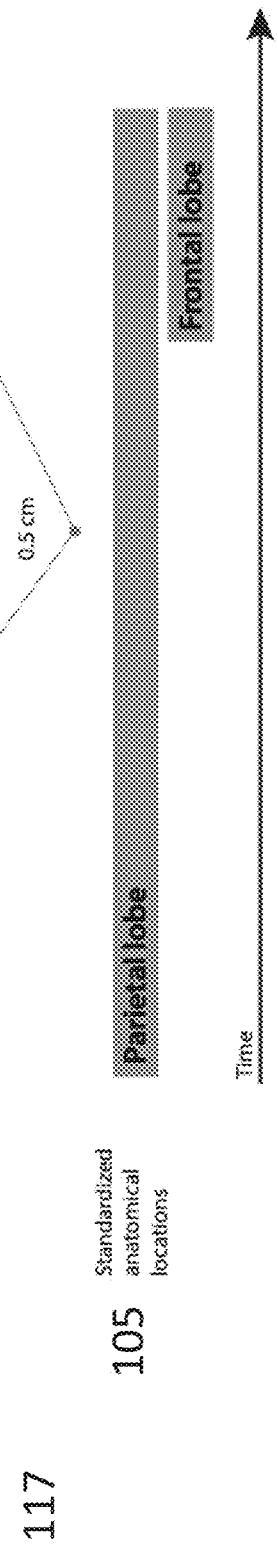
FIG. 1D shows output of structured patient-level data from an NLP method, according to certain embodiments.

FIGS. 1B-1D provide a visual representation of an illustrative NLP method. FIG. 1B shows exemplary inputs to an NLP method. In this example, the input (111) includes unstructured patient-level data from an electronic health record. This data can include unstructured, free-text radiology reports (101a, 101b, 101c, 101d) from different points in time. In the following sections, the components of the method are described. FIG. 1C shows the procedure of the method, including Step 1, Step 2a, Step 2b, Step 2c, and Step 2d. In Step 1 (112), a Named Entity Recognition model extracts tumor size entities (102a, 102b) and location entities (103a, 103b, 103c) from a free-text radiology report (101a). In Step 2a (113), a size parsing model determines the dimensions of the lesion (value and units) based on the size entities (102a, 102b, 102c). In Step 2b (114), a size-location linking model identifies tumor size entities (102a, 102b, 102c) and location entities (103a, 103b, 103c, 103d, 103e) referring to the same lesion. In this example, size entity 1 (102a) is linked to location entity 1 (103a), size entity 2 (102b) is linked to location entities 2 and 3 (103b, 103c), and size entity 3 (102c) is linked to location entities 4 and 5 (103d, 103e). In Step 2c (115), a hierarchical model determines the anatomical location (105a, 105b) of the lesion. In Step 2d (116), the method identifies tumor size entities (102a, 102b, 102c) referring to the same lesion (106a, 106b). In this example, size entities 1 and 2 (102a, 102b) refer to lesion 1 (106a), and size entity 3 (102c) refers to lesion 2 (106b). FIG. 1D shows example output (117) of the method, structured patient-level tumor size and location data, including the maximum tumor dimension (104) and standard anatomical locations (105), e.g., parietal lobe (top line) and frontal lobe (bottom line). As shown in the example output in FIG. 1D, changes in the maximum tumor dimension can be seen over time, as can the spread of the tumor from one location (parietal lobe) to another location (frontal lobe).

Each of the steps shown in FIGS. 1A-1D is described in greater detail below.

First, in Step 1 (112), a Named Entity Recognition model is used to extract tumor size and location entities from unstructured data inputs (e.g., free-text radiology reports). For the first step of the method, a Named Entity Recognition (NER) model (e.g., a BERT-based NER model) can be used to identify tumor size entities and location entities mentioned in the unstructured data input. In some embodiments, the NER model is based on another pre-trained language model (e.g., SciBERT or PubMedBERT). In some embodiments, the NER model is based on a custom pre-trained language model which is trained using text from documents from an EHR record, including clinical notes, pathology reports, radiology reports, and combinations thereof. The NER model can identify tumor size entities and location entities that are based on current observations of the tumor and not prior observations of the tumor. In some embodiments, the tumor size entities and locations entities can be extracted as strings of text that are processed in the following Step 2.

In some embodiments, the NER model is trained on an initial training dataset. An exemplary training data set includes manually annotated radiology reports from the electronic health record database. In some embodiments, a training data set includes on the order of hundreds or thousands of records. In some embodiments, a training data set includes reports from different cancer types. The annotations in the training data set can include size and location entities corresponding to tumors described in the radiology report. From these annotations, the model can learn how tumor size and location are described in reports. For example, the model can identify numbers and units associated with tumor size. Since references in the radiology reports to tumor sizes and tumor locations observed previously are not annotated, the model can also learn to identify tumor sizes and tumor locations from the current observation and to exclude prior observations.

FIG. 2 shows an example radiology report with tumor size and tumor location entities annotated. This example radiology report is for an MRI scan for an individual with a solid tumor in the brain and is unstructured text. In this example report, location entities are annotated by bold italics, while size entities are annotated by bold underlining. The radiology report in FIG. 2 includes a header with the type of scan: "EXAM: MR BRAIN WITH IV CONTRAST COMPARISON: MRI head dated Sep. 26, 2019, Oct. 26, 2018, Oct. 8, 2016." The report also includes the sections "Findings" and "Impression" and corresponding section headers. In some embodiments, section information can provide context and be used to link or process entities in Step 2. For example, section information can be used to inform size-location linking (step 2b), location standardization (step 2c), and lesion de-duplication (step 2d).

In the following steps, the extracted size and location entities can be processed to create a structured output.

Next, in Step 2a, (113) a size parsing model can be used to determine the dimensions of the lesion (value and units). For each tumor size entity that is extracted by the NER model, regular expressions can be used to parse the strings of the size entities into values and units corresponding to the dimensions of the lesion (e.g. "[0-9]+\.?[0-9]*\.[0-9]+" to identify numerical values and "cm|mm|centimeters|millimeters" to identify units). These parsed values and entities can be more readily used as structured data. For example, for the tumor size entity "1.8×1.2×1.4 cm," the model extracts the vector of numeric values [1.8, 1.2, 1.4] and the vector of units [cm, cm, cm]. In cases where the tumor size entity includes a range of numeric values, the method can return the average numeric value in the range (e.g. "3-4 mm" maps to "3.5 mm"). In addition, this method can be used to calculate the maximum dimension of the lesion by taking the maximum value of the parsed dimensions. In some embodiments, this method is also used to extract all three dimensions of the tumor, for example, to approximate three-dimensional tumor volume and surface area.

Next, in Step 2b (114), a size-location linking model can be used to identify tumor size and location entities referring to the same lesion. For each tumor size entity that is extracted by the NER model, a rule-based method can be used to determine which tumor location entities in the radiology report are associated with the same lesion. First, the model considers all tumor location entities which are in the same sentence as the tumor size entity. If there are multiple tumor size entities in a single sentence, the location entities are linked to the closest tumor size entity based on a distance metric. Non-limiting examples of distance metrics include the number of words or the shortest path in a dependency tree. In some embodiments, a dependency tree is generated using a dependency parser that tags word with their parts of speech (e.g., noun, verb, adjective, etc.) and identifies relationships (e.g., subject, object, modifier, etc.) among words in a sentence. For tumor size entities which do not have tumor location entities in the same sentence, the model considers tumor location entities in adjacent sentences, provided that these location entities are not already linked to any tumor size entities. In some embodiments, section information can be used to link size and location entities, for example, by linking only size entities with location entities within the same section.

Figure 3:
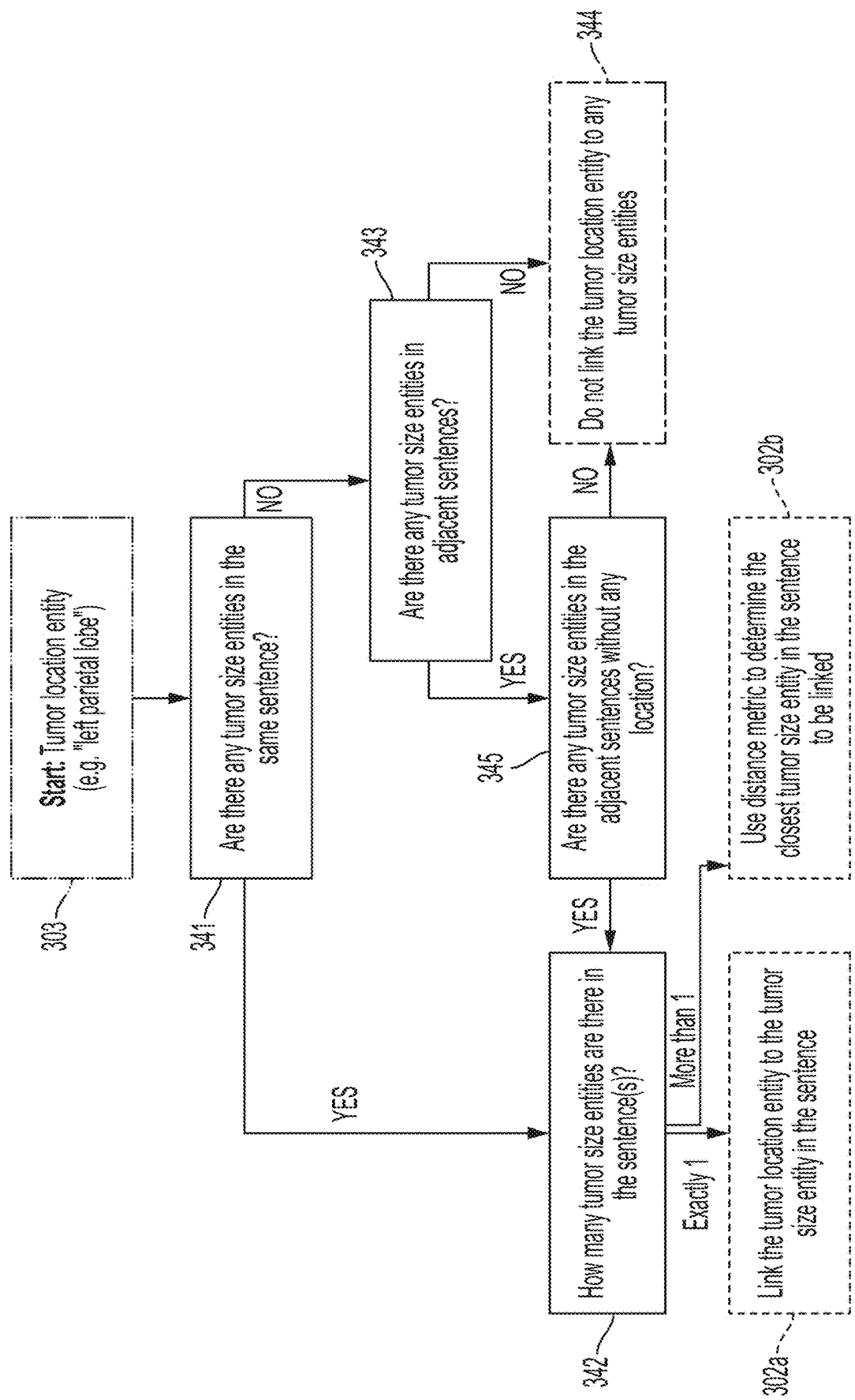
FIG. 3 shows a diagram of a tumor size-location linking method, according to certain embodiments.

FIG. 3 provides an illustrative visual representation of the size-location linking model. Starting with a tumor location entity (303), the model asks whether there are any tumor size entities in the same sentence or sentences (341). If yes, the model asks how many tumor size entities are in the sentence or sentences (342). If there is exactly one tumor size entity in the sentence or sentences, the tumor location entity is linked to that tumor size entity (302a, dotted line). If there is more than one tumor size entity in the sentence or sentences, a distance metric is used to determine the closest tumor size entity, and the tumor location entity is linked to the closest tumor size entity (302b). If there are no tumor size entities in the same sentence (341), the model asks whether there are any tumor size entities in adjacent sentences (343). If no, the tumor location entity is not linked to any tumor size entities (344). If yes, the model asks whether there are any tumor size entities in the adjacent sentences without a location (345). If no, the tumor location entity is not linked to any tumor size entities (344). If yes, the model asks how many tumor size entities are in the sentence or sentences (342). If there is exactly one tumor size entity in the sentence or sentences, the tumor location entity is linked to that tumor size entity (302a). If there is more than one tumor size entity in the sentence or sentences, a distance metric is used to determine the closest tumor size entity, and the tumor location entity is linked to the closest tumor size entity (302b).

In Step 2c (115), a hierarchical model can be used to determine the anatomical location of a lesion. For each tumor size entity that is extracted by the NER model, the model can use a rule-based method to determine the anatomical location of the corresponding lesion.

An anatomical location can have various forms. In some embodiments, an anatomical location can include a side of the body, for example, right, left, bilateral, midline, lateral, medial, dorsal, ventral, proximal, distal, or combinations thereof. In some embodiments, an anatomical location can include a lobe of the brain, for example, frontal, parietal, temporal, occipital, or combinations thereof. In some embodiments, an anatomical location can include a region of the brain, for example, corpus callosum, basal ganglia, thalamus, cerebellum, other regions of the brainstem, or combinations thereof. In some embodiments, an anatomical location can include a subregion of an organ system, for example, a subregion of the integumentary system, skeletal system, muscular system, lymphatic system, respiratory system, digestive system, nervous system, endocrine system, cardiovascular system, urinary system, reproductive system, or combinations thereof. In some embodiments, an anatomical location can include a subsection of an organ, for example, a subsection of bladder, brain, heart, kidney, intestines, lung, liver, stomach, bone, muscle, skin, or combinations thereof.

To determine an anatomical location, first, the model can identify the exam type of the radiology report using metadata or the header information at the top of the report (e.g. "EXAM: CT CHEST WITH IV CONTRAST"). Some reports include exam type as a structured field that can be used directly. In other reports, exam type can be extracted as the first line of text in the unstructured text of the report. In some embodiments, section information can be used to identify the exam type. Next, the model can map this report type to a dictionary containing all of the possible anatomical locations of lesions which may be described in this type of radiology report (e.g. "EXAM: CT CHEST WITH IV CONTRAST" maps to lesions in the lung and heart). In some embodiments, the dictionary is generated from clinicians grouping different reports to different anatomical locations. In some embodiments, to improve performance, each exam or report type is mapped to a single anatomical location (e.g. "EXAM: CT CHEST WITH IV CONTRAST" maps to chest, "MR BRAIN WITHOUT AND WITH IV CONTRAST HISTORY" maps to brain).

Second, if the exam type maps to more than one anatomical location, then the model can use the linked location entities to determine the location of each lesion described in the radiology report (e.g. "left upper lobe" maps to lung). For each extracted location entity, the model determines the anatomical location using a look-up table. In some embodiments, the look-up table is generated manually by clinicians. In rare cases when the lesion is linked to more than one anatomical location, the model can report all of the anatomical locations for the lesion returned by the model.

Figure 4:
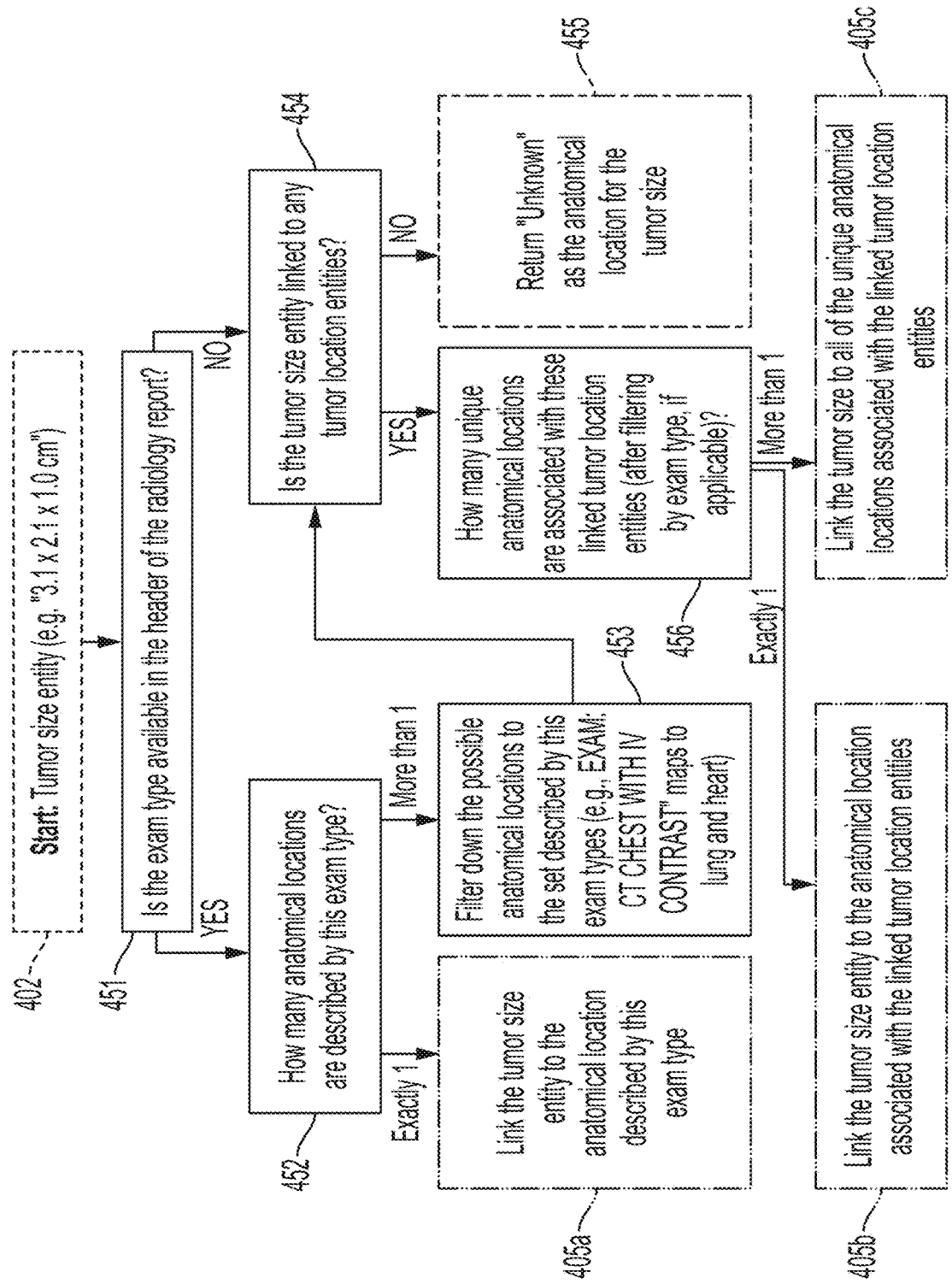
FIG. 4 shows a diagram of a hierarchical model to determine anatomical locations of lesions.

FIG. 4 provides an illustrative visual representation of the size-location linking model. Starting with a tumor size entity (402), the model asks whether the exam type is available in the header of the radiology report (451). If yes, the exam type is available, the model asks how many anatomical locations are described by this exam type (452). If exactly one anatomical location is described by this exam type, the tumor size entity is linked to the anatomical location (405a) that is linked to the exam type. If more than one anatomical location is described by this exam type, the model will filter down the possible anatomical locations for this exam type (453) and ask if the tumor size entity is linked to any tumor location entities (454). If no, the model returns "Unknown" as the anatomical location for the tumor size (455). If yes, the model asks how many unique anatomical locations are associated with these linked tumor location entities (456). If exactly one anatomical location is associated with the linked tumor location entities, the tumor size entity is linked to that anatomical location (405b). If more than one anatomical location is associated with the linked tumor locations entities, the tumor size entity is linked to all of the anatomical locations associated with the linked tumor location entities (405c). If the exam type is not available in the header (451), the model asks if the tumor size entity is linked to any tumor location entities (454). If no, the model returns "Unknown"

as the anatomical location for the tumor size (455). If yes, the model asks how many unique anatomical locations are associated with these linked tumor location entities (456). If exactly one anatomical location is associated with the linked tumor location entities, the tumor size entity is linked to that anatomical location (405b). If more than one anatomical location is associated with the linked tumor locations entities, the tumor size entity is linked to all of the anatomical locations associated with the linked tumor location entities (405c).

Next, in step 2d (116), an algorithm can identify tumor size entities referring to the same lesion. For each tumor size entity extracted by the NER model, a rule-based method can be used to identify any other size entities that are referring to the same lesion. This deduplication step is performed so that lesions are not double-counted and so that each lesion is linked to all of its corresponding size and location entities. In radiology reports, it is common for a lesion to have a detailed description in a primary section of the report (e.g. "Findings") as well as a brief mention in a summary section (e.g. "Impression", "Conclusion"), so the method described here can merge these types of duplicates.

First, an NLP algorithm can identify the different sections of the report (e.g. "Findings", "Impression", "Conclusion"). This NLP algorithm can make use of an inventory based on medical data to identify important sections first. This algorithm can be further enhanced by using note syntactics to detect other possible sections which are not part of the inventory. If the tumor size entity is mentioned in a primary section of the radiology report (e.g. "Findings") or the section information is not available, then a unique lesion number is assigned to the tumor size entity. On the other hand, if the tumor size entity is mentioned in a summary section (e.g. "Impression", "Conclusion"), the maximum dimension of the tumor size entity is compared to the maximum dimensions of the tumor size entities mentioned in the other sections of the report (using size information extracted in Step 2a). If there is an exact match between the two sizes, or if the sizes approximately match and there is an appropriate estimation keyword located near one of the sizes (e.g. "2.1×1.0×1.0 cm" and "approximately 2 cm"), then two tumor size entities are assigned to the same lesion number. Non-limiting examples of estimation keywords include "approximately," "roughly," "approx.," and "about." Additional estimation keywords can be identified using a training set of radiology reports. In some embodiments, rounding can be used to determine a tolerance or range of values that approximately match. For example a training set can be used to determine a tolerance or range of values that approximately match.

Figure 5:
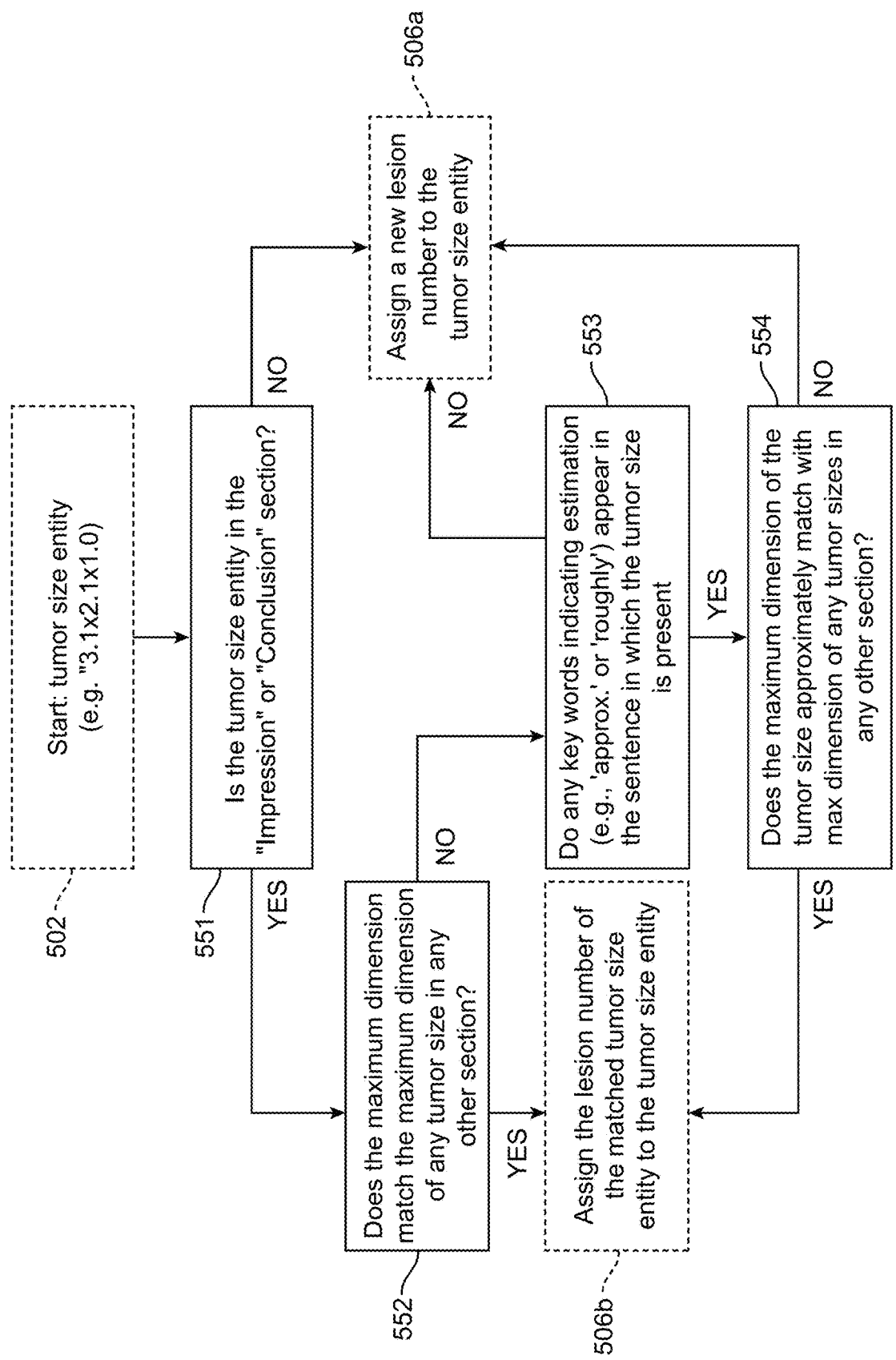
FIG. 5 shows a diagram of a tumor size linking method, according to certain embodiments.

FIG. 5 provides an illustrative visual representation of the tumor size linking algorithm. Starting with a tumor size entity (502, dotted line), the model checks if the tumor size entity is in the "Impression" or "Conclusion" section (551). If no, the model assigns a new lesion number (506a). If yes, the model checks whether the maximum dimension of the size entity matches the maximum dimension of any size entity in any other section (552). If yes, the model assigns the lesion number of the matched tumor size entity to the tumor size entity (506b, heavy solid line). If no, the model checks whether any key words indicating estimation appear in the sentence in which the size entity is present (553). If there are no key words indicating estimation, the model assigns a new lesion number (506a). If there are key words indicating estimation, the model checks whether the maximum dimension of the tumor size approximately match with the maximum dimension of any tumor sizes in any other section (554). If yes, the model assigns the lesion number of the matched tumor size entity to the tumor size entity (506b). If no, the model assigns a new lesion number (506a).

Structured patient-level output containing tumor size and location has various applications. For example, output for a single patient can be used to create a summary of the patients reports over time. Such a report can allow a physician to view tumor size and location over time in a summary report without having to search for this information within the unstructured text reports. Monitoring tumor size over time is useful clinically to monitor tumor progression, evaluate treatment, or identify recurrence. Alternatively, data from multiple patients can be used for analysis. The structured output can be integrated with other structured data for analysis, and this analysis can be used to evaluate patient outcome as a function of any other information available in the patients' electronic health record. For example, this method can be used to evaluate the effectiveness of a chemotherapy treatment in a particular subpopulation defined by tumor size and/or location information (e.g. temozolomide for the treatment of patients with glioblastoma and tumor size>4 cm at diagnosis). As an additional example, this method can be used to identify cancer patients who meet inclusion criteria for clinical trials based upon their tumor size and/or location information.

In some embodiments, a user interface can show structured output of tumor size and tumor location entities. For example, a user interface can show tumor size and tumor location entities in a digital representation of an unstructured input, e.g., a free-text radiology report used in an electronic report used in an electronic health record system. For example, a user interface can be used to show tumor size and tumor location entities along with their relations visually emphasized in a digital representation of an unstructured input (e.g., a free-text radiology report). Such a digital representation can be used for research purposes. In some embodiments, a user interface can be used to facilitate chart review (e.g., review of a patients EHR, for example to identify clinical characteristics) or additional tagging of entities in free-text radiology reports.

EXAMPLES

Certain embodiments will now be described in the following non-limiting examples.

Tables 1 and 2 show method performance. Table 1 shows the out-of-sample performance of each step of the method evaluated on a gold-standard manually annotated dataset of 120 radiology reports (20 glioblastoma, 20 lung cancer, 20 breast cancer, 20 prostate cancer, 20 rectal cancer, 20 colon cancer). The NER model has strong performance (tumor size F1-score: 87%, tumor location F1-score: 71%). The size parsing and size-location linking models are near perfect, with F1-scores of 98% and 96%, respectively. The hierarchical model for tumor location has strong performance (F1 score: 82%).

TABLE 1

Out-of-sample performance for each step of the method

| Step of the method | F1-score | Accuracy |
|---|---|---|
| Step 1 - NER model for tumor size | 87% | |
| Step 1 - NER model for tumor location | 71% | |
| Step 2a - Size parsing model | 98% | 95% (250/262) |
| Step 2b - Size-location linking model | 96% | 93% (243/262) |
| Step 2c - Hierarchical model for tumor | 82% | 69% (182/262) |

TABLE 1-continued

Out-of-sample performance for each step of the method

| Step of the method | F1-score | Accuracy |
|---|---|---|
| location | | |
| Step 2d - Algorithm to identify tumor size entities referring to the same lesion | 98% | 95% (249/261) |

Table 2 shows the overall performance of the NLP system to extract structured tumor size and location information from radiology reports. These results are from 120 tumor size entities having the largest size extracted by the NER model from 120 radiology reports (20 glioblastoma, 20 lung cancer, 20 breast cancer, 20 prostate cancer, 20 rectal cancer, 20 colon cancer). For each report, the model outputs for the maximum dimension and the location entities linked to the largest lesion are highly accurate (maximum dimension: 82%, location entities linked: 81%). The accuracy of the model outputs for the anatomical location of the lesion is 64%.

TABLE 2

Out-of-sample performance for the final NLP system outputs.

| Final NLP system output | F1-score | Accuracy |
|---|---|---|
| Maximum dimension of the largest lesion | 90% | 82% (98/120) |
| Location entities linked to the largest lesion | 89% | 81% (97/120) |
| Anatomical location of the largest lesion information) | 78% | 64% (77/120) |

A general NER model was trained to tag tumor size and location on 5871 sentences from 1359 reports (size F1: 87%. Location F1: 71%) (string matching). The performance of the model is broken down by cancer type in Table 3 below.

TABLE 3

Performance of NER model for tagging tumor size and location by cancer type

| Cancer type | Number of Reports | Size F1-score | Location F1-score |
|---|---|---|---|
| Glioblastoma | 624 | 80% | 74% |
| Lung cancer | 193 | 95% | 80% |
| Breast cancer | 103 | 87% | 67% |
| Prostate cancer | 171 | 86% | 67% |
| Rectal cancer | 93 | 72% | 51% |
| Colon cancer | 175 | 92% | 75% |

A gold standard validation set of 120 reports was used to validate the model. The gold standard set included 20 glioblastoma, 20 lung, 20 breast, 20 colon, 20 rectal, and 20 prostate reports. The model began with a manually tagged dataset from the validation sets, then completed entity linking for each tumor size entity and tumor location entity. An organ system category (e.g., brain, lung, colon, etc.) was assigned to each size entity and a maximum dimension of each size entity was given with units (e.g., 1.2 mm) This structured data is shown below in Table 4.

TABLE 4

Gold standard validation

| Cancer type | Report number | Text of size entity | Maximum dimension (cm) | Organ system | Text of location entities linked |
|---|---|---|---|---|---|
| Glioblastoma | 1 | 3.1 × 2.1 × 1.0 cm | 3.1 | Brain | left parietal lobe; corpus callosum |
| Glioblastoma | 1 | 4.1 × 2.1 × 1.0 cm | 4.1 | Kidney | left lobe |
| Glioblastoma | 2 | 1.1 × 2.1 × 1.0 cm | 1.1 | Brain | frontal lobe |
| ... | | | | | |

Untagged radiology reports were used for validation of the overall algorithm for glioblastoma and the general model. For validation of tumor size extraction, value and units for maximum dimension were matched. Correct size extraction required that the NER model output for size was correct. Performance of tumor size extraction was evaluated overall and by cancer type. For validation of size-location linking, all location entities listed for each size entity were matched. Correct size-location linking required that the NER model output for size-location was correct. Performance of size-location linking was evaluated overall and by cancer type. For organ system validation, the organ system for each size entity was matched. Correct organ system determination required the NER model output for size to be correct, the NER model output for at least one location entity in the organ system to be correct, and the size-location linking algorithm to be correct for at least one size/location pair. Performance of organ system determination was evaluated overall and by cancer type (e.g. brain vs. non-brain)

For validation of the size parsing algorithm, values and units for maximum dimension were compared between the model and the gold standard set. 120 reports from the gold standard set were used. For size validation, the values and units for maximum dimension needed to match. To calculate validation metrics, it was assumed that tumor size and location entities were extracted perfectly by the NER Model. The out-of-sample accuracy of the tumor size parsing algorithm is shown below in Table 5. For each cancer type, the number of times that the maximal tumor size was parsed correctly (value and units) was counted. For example, the correct maximal dimension of the tumor size "3.1×2.2×1.1 cm" would be 3.1 cm.

TABLE 5

Out-of-sample accuracy of tumor size parsing algorithm

| Dataset | Number of tumor size entities | Accuracy starting from gold-standard entities |
|---|---|---|
| Glioblastoma (n = 20) | 39 | 100% (39/39) |
| Lung cancer (n = 20) | 62 | 100% (62/62) |
| Breast cancer (n = 20) | 32 | 84% (27/32) |
| Colon cancer (n = 20) | 42 | 93% (39/42) |
| Rectal cancer (n = 20) | 47 | 100% (47/47) |
| Prostate cancer (n = 20) | 40 | 90% (36/40) |
| All cancers (n = 120) | 262 | 95% (250/262) |

For validation of the size-location linking algorithm, linked size-location entities were compared between the model and the gold-standard set. 120 reports from the gold standard set were used. For size-location linking validation, each size entity needed to match all location entities listed.

To calculate validation metrics, it was assumed that tumor size and location entities were extracted perfectly by the NER model. The out-of-sample accuracy of the tumor size-linking algorithm is shown below in Table 6. For each cancer type, the number of times that all of the tumor locations were matched correctly for each tumor size entity was counted.

TABLE 6

Out-of-sample accuracy of tumor size-location linking algorithm

| Dataset | Number of tumor size entities | Accuracy starting from gold-standard entities |
| --- | --- | --- |
| Glioblastoma (n = 20) | 39 | 97% (38/39) |
| Lung cancer (n = 20) | 62 | 98% (61/62) |
| Breast cancer (n = 20) | 32 | 91% (29/32) |
| Colon cancer (n = 20) | 42 | 86% (36/42) |
| Rectal cancer (n = 20) | 47 | 85% (40/47) |
| Prostate cancer (n = 20) | 40 | 97% (39/40) |
| All cancers (n = 120) | 262 | 93% (243/262) |

For validation of the organ system algorithm, a general tumor location dictionary was used based on the exam type (from the header) and the algorithm to be developed. A summary of exam types is shown below in Table 7.

TABLE 7

Exam types from header

| Exam Type | Number of Reports | Number of Patients | Organ system classification |
| --- | --- | --- | --- |
| MR BRAIN WITHOUT AND WITH IV CONTRAST COMPARISON | 20 | 5 | Brain |
| MR BRAIN WITH IV CONTRAST COMPARISON | 10 | 4 | Brain |
| CT CHEST WITHOUT IV CONTRAST | 250 | 60 | Chest |
| ... | | | |

For the organ system algorithm, a dictionary was used to map tumor location entities to organ systems. 120 reports from the gold standard set were used. For organ system validation, each size entity needed to match the organ system. To calculate validation metrics, it was assumed that tumor size and location entities are extracted perfectly by the NER model. The out-of-sample accuracy of organ system algorithm is shown in Table 8 below. For each cancer type, the number of times that the organ system was identified correctly for each tumor size entity was counted.

TABLE 8

Out-of-sample accuracy of organ system algorithm

| Dataset | Number of tumor size entities | Accuracy starting from gold-standard entities |
| --- | --- | --- |
| Glioblastoma (n = 20) | 39 | 97% (38/39) |
| Lung cancer (n = 20) | 62 | 74% (46/62) |
| Breast cancer (n = 20) | 32 | 78% (25/32) |
| Colon cancer (n = 20) | 42 | 45% (19/42) |
| Rectal cancer (n = 20) | 47 | 62% (29/47) |
| Prostate cancer (n = 20) | 40 | 62% (25/40) |
| All cancers (n = 120) | 262 | 69% (182/262) |

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

Furthermore, an implementation of the communication protocol can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The methods for the communications protocol can also be embedded in a non-transitory computer-readable medium or computer program product, which comprises all the features enabling the implementation of the methods described herein, and which, when loaded in a computer system is able to carry out these methods. Input to any part of the disclosed systems and methods is not limited to a text input interface. For example, they can work with any form of user input including text and speech.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this communications protocol can be embodied in other specific forms without departing from the spirit or essential attributes thereof, and accordingly, reference should be had to the following claims, rather than to the foregoing specification, as indicating the scope of the invention.

The communications protocol has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

It will be appreciated that while one or more particular materials or steps have been shown and described for purposes of explanation, the materials or steps may be varied in certain respects, or materials or steps may be combined, while still obtaining the desired outcome. Additionally, modifications to the disclosed embodiment and the invention as claimed are possible and within the scope of this disclosed invention.

The invention claimed is:

1. A method comprising:
  receiving an input of unstructured data comprising a plurality of health records of an individual, wherein each health record of the individual comprises a free-text radiography report from a point in time;
  extracting at least one size entity and at least one location entity from the unstructured data using a named entity recognition model, wherein the named entity recognition model is a pre-trained BERT-based named entity recognition model trained using a dataset of free-text radiography reports which are manually annotated to highlight size entities and location entities current to a particular radiography report, wherein extracting the at least one size entity and the at least one location entity comprises:
    extracting from a first free-text radiography report of the individual a first size entity and a first location entity of a first lesion while excluding results of any past radiography reports, wherein the first radiography report is obtained at a first time, wherein the first size entity comprises a first size of the first lesion, wherein the first location entity comprises a first anatomical location of the first lesion; and
    extracting from a second free-text radiography report of the individual a second size entity and a second location entity of a second lesion while excluding results of any past radiography reports including the first radiography report, wherein the second radiography report is obtained at a second time after the first time;
  identifying that the second lesion is a later version of the first lesion by confirming that the second location entity comprises the same anatomical location as the first anatomical location, wherein the second size entity comprises an updated size of the first lesion;
  parsing dimensions and values of the at least one size entity including the first size entity and the second size entity; and
  outputting structured size data, from the parsed dimensions and values, and structured location data by displaying the structured size data and the structured location data as a function of time, wherein the display of the structured size data reports changes in size of the same lesion at the same anatomical location between the first time and the second time allowing a user to view lesion progression and evaluate treatment without having to search within the unstructured data.

2. The method of claim 1, further comprising linking the at least one size entity and the at least one location entity.

3. The method of claim 2, wherein the at least one location entity is in a sentence with exactly one size entity and that location entity is linked with that size entity.

4. The method of claim 2, wherein the at least one location entity is in a sentence with more than one size entity and that location entity is linked with a size entity with a closest distance metric.

5. The method of claim 4, wherein the distance metric is a number of words.

6. The method of claim 4, wherein the distance metric is a path in a dependency tree.

7. The method of claim 2, wherein the at least one location entity is in a sentence without a size entity and is linked to a size entity in an adjacent sentence.

8. The method of claim 1, further comprising determining an anatomical location for the at least one size entity.

9. The method of claim 8, wherein determining the anatomical location comprises using metadata of the input.

10. The method of claim 8, wherein determining the anatomical location comprises using a dictionary mapping types of health records to anatomical locations.

11. The method of claim 8, wherein determining the anatomical location comprises using a location entity linked with the at least one size entity.

12. The method of claim 1, comprising extracting more than one size entity and further comprising identifying any size entities that refer to a common lesion.

13. The method of claim 12, wherein identifying any size entities that refer to a common lesion comprises comparing dimensions of two or more size entities.

14. The method of claim 12, wherein identifying any size entities that refer to a common lesion comprises identifying a section of the input where the size entities are located.

15. The method of claim 12, wherein identifying any size entities that refer to a common lesion comprises identifying an estimation keyword.

16. The method of claim 1, wherein the named entity recognition model is trained using an annotated unstructured dataset.

17. The method of claim 1, wherein the named entity recognition model is trained using a dataset of manually annotated health records.

18. The method of claim 1, wherein the named entity recognition model extracts size entities and location entities from a current observation without extracting size entities and location entities from a prior observation.

19. The method of claim 1, wherein parsing the dimensions comprises using regular expressions.

20. The method of claim 1, wherein parsing the dimensions of each of the size entities comprises extracting a vector of numeric values and a vector of units.

21. The method of claim 1, wherein parsing the dimensions of each of the size entities comprises calculating a maximum dimension of each parsed size entity.

22. A system comprising:
  a non-transitory memory; and
  one or more hardware processors configured to read instructions from the non-transitory memory that, when executed cause one or more of the hardware processors to perform operations comprising:
    receiving an input of unstructured data comprising a plurality of health records of an individual, wherein each health record of the individual comprises a free-text radiography report from a point in time;
    extracting at least one size entity and at least one location entity from the unstructured data using a named entity recognition model, wherein the named entity recognition model is a pre-trained BERT-based named entity recognition model trained using a dataset of free-text radiography reports which are manually annotated to highlight size entities and location entities current to a particular radiography report, wherein extracting the at least one size entity and the at least one location entity comprises:

extracting from a first free-text radiography report of the individual a first size entity and a first location entity of a first lesion while excluding results of any past radiography reports, wherein the first radiography report is obtained at a first time, wherein the first size entity comprises a first size of the first lesion, wherein the first location entity comprises a first anatomical location of the first lesion; and extracting from a second free-text radiography report of the individual a second size entity and a second location entity of a second lesion while excluding results of any past radiography reports including the first radiography report, wherein the second radiography report is obtained at a second time after the first time;

identifying that the second lesion is a later version of the first lesion by confirming that the second location entity comprises the same anatomical location as the first anatomical location, wherein the second size entity comprises an updated size of the first lesion;

parsing dimensions and values of the at least one size entity including the first size entity and the second size entity; and outputting structured size data, from the parsed dimensions and values, and structured location data by displaying the structured size data and the structured location data as a function of time, wherein the display of the structured size data reports changes in size of the same lesion at the same anatomical location between the first time and the second time allowing a user to view lesion progression and evaluate treatment without having to search within the unstructured data.

23. The system of claim 22, wherein the operations further comprise linking the at least one size entity and the at least one location entity.

24. The system of claim 23, wherein the at least one location entity is in a sentence with exactly one size entity and that location entity is linked with that size entity.

25. The system of claim 23, wherein the at least one location entity is in a sentence with more than one size entity and that location entity is linked with a size entity with a closest distance metric.

26. The system of claim 23, wherein the at least one location entity is in a sentence without a size entity and is linked to a size entity in an adjacent sentence.

27. The system of claim 22, wherein the operations further comprise determining an anatomical location for the at least one size entity.

28. The system of claim 27, wherein determining the anatomical location comprises using metadata of the input.

29. The system of claim 27, wherein determining the anatomical location comprises using a location entity linked with the at least one size entity.

30. The system of claim 22, wherein the operations further comprise extracting more than one size entity and further comprising identifying any size entities that refer to a common lesion.

31. The system of claim 30, wherein identifying any size entities that refer to a common lesion comprises comparing dimensions of two or more size entities.

32. The system of claim 22, wherein the named entity recognition model is trained using an annotated unstructured dataset.

33. The system of claim 22, wherein the named entity recognition model extracts only size entities and location entities from a current observation without extracting size entities from a prior observation.

34. A non-transitory computer-readable medium storing instructions that, when executed by one or more hardware processors, cause the one or more hardware processors to perform operations comprising:

receiving an input of unstructured data comprising a plurality of health records of an individual, wherein each health record of the individual comprises a free-text radiography report from a point in time;

extracting at least one size entity and at least one location entity from the unstructured data using a named entity recognition model, wherein the named entity recognition model is a pre-trained BERT-based named entity recognition model trained using a dataset of free-text radiography reports which are manually annotated to highlight size entities and location entities current to a particular radiography report, wherein extracting the at least one size entity and the at least one location entity comprises:

extracting from a first free-text radiography report of the individual a first size entity and a first location entity of a first lesion while excluding results of any past radiography reports, wherein the first radiography report is obtained at a first time, wherein the first size entity comprises a first size of the first lesion, wherein the first location entity comprises a first anatomical location of the first lesion; and extracting from a second free-text radiography report of the individual a second size entity and a second location entity of a second lesion while excluding results of any past radiography reports including the first radiography report, wherein the second radiography report is obtained at a second time after the first time;

identifying that the second lesion is a later version of the first lesion by confirming that the second location entity comprises the same anatomical location as the first anatomical location, wherein the second size entity comprises an updated size of the first lesion;

parsing dimensions and values of the at least one size entity including the first size entity and the second size entity; and outputting structured size data, from the parsed dimensions and values, and structured location data by displaying the structured size data and the structured location data as a function of time, wherein the display of the structured size data reports changes in size of the same lesion at the same anatomical location between the first time and the second time allowing a user to view lesion progression and evaluate treatment without having to search within the unstructured data.

35. The non-transitory computer-readable medium of claim 34, wherein the operations further comprise linking the at least one size entity and the at least one location entity.

36. The non-transitory computer-readable medium of claim 35, wherein the at least one location entity is in a sentence with exactly one size entity and that location entity is linked with that size entity.

37. The non-transitory computer-readable medium of claim 35, wherein the at least one location entity is in a sentence with more than one size entity and that location entity is linked with a size entity with a closest distance metric.

38. The non-transitory computer-readable medium of claim 35, wherein the at least one location entity is in a sentence without a size entity and is linked to a size entity in an adjacent sentence.

39. The non-transitory computer-readable medium of claim 34, wherein the operations further comprise determining an anatomical location for the at least one size entity.

40. The non-transitory computer-readable medium of claim 39, wherein determining the anatomical location comprises using metadata of the input.

41. The non-transitory computer-readable medium of claim 39, wherein determining the anatomical location comprises using a location entity linked with the at least one size entity.

42. The non-transitory computer-readable medium of claim 34, wherein the operations further comprise extracting more than one size entity and further comprising identifying any size entities that refer to a common lesion.

43. The non-transitory computer-readable medium of claim 42, wherein identifying any size entities that refer to a common lesion comprises comparing dimensions of two or more size entities.

44. The non-transitory computer-readable medium of claim 34, wherein the named entity recognition model is trained using an annotated unstructured dataset.

45. The non-transitory computer-readable medium of claim 34, wherein the named entity recognition model extracts only size entities and location entities from a current observation without extracting size entities from a prior observation.

* * * * *